United States Patent
Isobe et al.

(10) Patent No.: US 10,514,320 B2
(45) Date of Patent: Dec. 24, 2019

(54) TEMPERATURE ESTIMATION DEVICE AND TEMPERATURE ESTIMATION METHOD

(71) Applicant: FANUC CORPORATION, Yamanashi (JP)

(72) Inventors: Gaku Isobe, Yamanashi-ken (JP); Yuuzou Inaguchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/122,108

(22) Filed: Sep. 5, 2018

(65) Prior Publication Data

US 2019/0072458 A1 Mar. 7, 2019

(30) Foreign Application Priority Data

Sep. 7, 2017 (JP) ................. 2017-171697

(51) Int. Cl.
*B23Q 17/00* (2006.01)
*G01M 13/04* (2019.01)
*B23Q 17/09* (2006.01)
*B23Q 17/10* (2006.01)
*B23Q 11/14* (2006.01)

(52) U.S. Cl.
CPC ......... *G01M 13/04* (2013.01); *B23Q 17/0985* (2013.01); *B23Q 17/10* (2013.01); *B23Q 11/14* (2013.01)

(58) Field of Classification Search
CPC .... B23Q 17/0985; B23Q 17/10; B23Q 11/14; G01M 13/04
See application file for complete search history.

(56) References Cited

U.S. PATENT DOCUMENTS

2006/0089745 A1  4/2006  Suzuki et al.
2006/0178761 A1*  8/2006  Besuchet .............. B23Q 11/14
                                                     700/29
2017/0033728 A1  2/2017  Yukawa

FOREIGN PATENT DOCUMENTS

JP  4240045 A  8/1992
JP  9126912 A  5/1997
JP  2000205972 A  7/2000
JP  2002346884 A  12/2002
JP  2003254840 A  9/2003
JP  2004309221 A  11/2004

(Continued)

OTHER PUBLICATIONS

English Abstract and Machine Translation for Japanese Publication No. 2002-346884 A, published Dec. 4, 2002, 6 pgs.

(Continued)

*Primary Examiner* — Alan Snyder
(74) *Attorney, Agent, or Firm* — Fredrikson & Byron, P.A.

(57) ABSTRACT

In a temperature estimation method, a rotational speed of a spindle is acquired. Moreover, a temperature rise table and a temperature fall table are used to calculate a temperature of a bearing from the rotational speed of the spindle every time a fixed time elapses. The temperature rise table stores in an associated manner the rotational speed of the spindle and a temperature rise of the bearing due to rotation of the spindle in a predetermined fixed time. The temperature fall table stores in an associated manner the temperature of the bearing and a temperature fall of the bearing due to heat dissipation in the fixed time.

6 Claims, 3 Drawing Sheets

(56) References Cited

FOREIGN PATENT DOCUMENTS

| JP | 2006116663 A | 5/2006 |
|----|--------------|--------|
| JP | 200710436 A | 1/2007 |
| JP | 2010276074 A | 12/2010 |
| JP | 201734811 A | 2/2017 |

OTHER PUBLICATIONS

English Abstract for Japanese Publication No. 2006116663 A, published May 11, 2016, 2 pgs.
English Abstract for Japanese Publication No. 2017034811 A, published Feb. 9, 2017, 2 pgs.
English Abstract and Machine Translation for Japanese Publication No. 2004-309221 A, published Nov. 4, 2004, 12 pgs.
English Abstract and Machine Translation for Japanese Publication No. 2003-254840 A, published Sep. 10, 2003, 8 pgs.
English Abstract and Machine Translation for Japanese Publication No. 2000-205972 A, published Jul. 28, 2000, 7 pgs.
English Machine Translation for Japanese Publication No. JPH04-240045 A, published Aug. 27, 1992, 6 pgs.
English Abstract and Machine Translation for Japanese Publication No. JPH09-126912 A, published May 16, 1997, 10 pgs.
English Abstract and Machine Translation for Japanese Publication No. 2010-276074 A, published Dec. 9, 2010, 12 pgs.
English Abstract and Machine Translation for Japanese Publication No. 2007-010436 A, published Jan. 18, 2007, 7 pgs.

* cited by examiner

TEMPERATURE ESTIMATION DEVICE AND TEMPERATURE ESTIMATION METHOD

CROSS-REFERENCE TO RELATED APPLICATION

This application is based upon and claims the benefit of priority from Japanese Patent Application No. 2017-171697 filed on Sep. 7, 2017, the contents of which are incorporated herein by reference.

BACKGROUND OF THE INVENTION

Field of the Invention

The present invention relates to a temperature estimation device and a temperature estimation method for estimating a temperature of a bearing that supports a spindle in a rotatable manner.

Description of the Related Art

Japanese Laid-Open Patent Publication No. 2002-346884 discloses that a temperature of a bearing for a spindle is measured by a temperature sensor.

SUMMARY OF THE INVENTION

However, when such a temperature sensor is installed as in Japanese Laid-Open Patent Publication No. 2002-346884, costs increase.

Thus, an object of the present invention is to provide a temperature estimation device and a temperature estimation method for accurately estimating (calculating) a temperature of a bearing at low cost, without using a temperature sensor.

A first aspect of the present invention is a temperature estimation device for calculating a temperature of a bearing configured to support a spindle of a machine tool in a rotatable manner, including a rotational speed acquiring unit configured to acquire a rotational speed of the spindle, a temperature rise table in which the rotational speed of the spindle and a temperature rise of the bearing due to rotation of the spindle in a predetermined fixed time are stored in an associated manner, a temperature fall table in which the temperature of the bearing and a temperature fall of the bearing due to heat dissipation in the fixed time are stored in an associated manner, and a bearing temperature calculating unit configured to use the temperature rise table and the temperature fall table to calculate the temperature of the bearing from the rotational speed of the spindle every time the fixed time elapses.

A second aspect of the present invention is a temperature estimation method for calculating a temperature of a bearing configured to support a spindle of a machine tool in a rotatable manner, including a rotational speed acquisition step of acquiring a rotational speed of the spindle, and a bearing temperature calculation step of, by using a temperature rise table in which the rotational speed of the spindle and a temperature rise of the bearing due to rotation of the spindle in a predetermined fixed time are stored in an associated manner, and also by using a temperature fall table in which the temperature of the bearing and a temperature fall of the bearing due to heat dissipation in the fixed time are stored in an associated manner, calculating the temperature of the bearing from the rotational speed of the spindle every time the fixed time elapses.

The present invention makes it possible to accurately estimate (calculate) a temperature of a bearing at low cost, without using a temperature sensor.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a temperature estimation device and a temperature estimation method according to the present invention will be presented and described in detail below with reference to the accompanying drawings.

Figure 1:
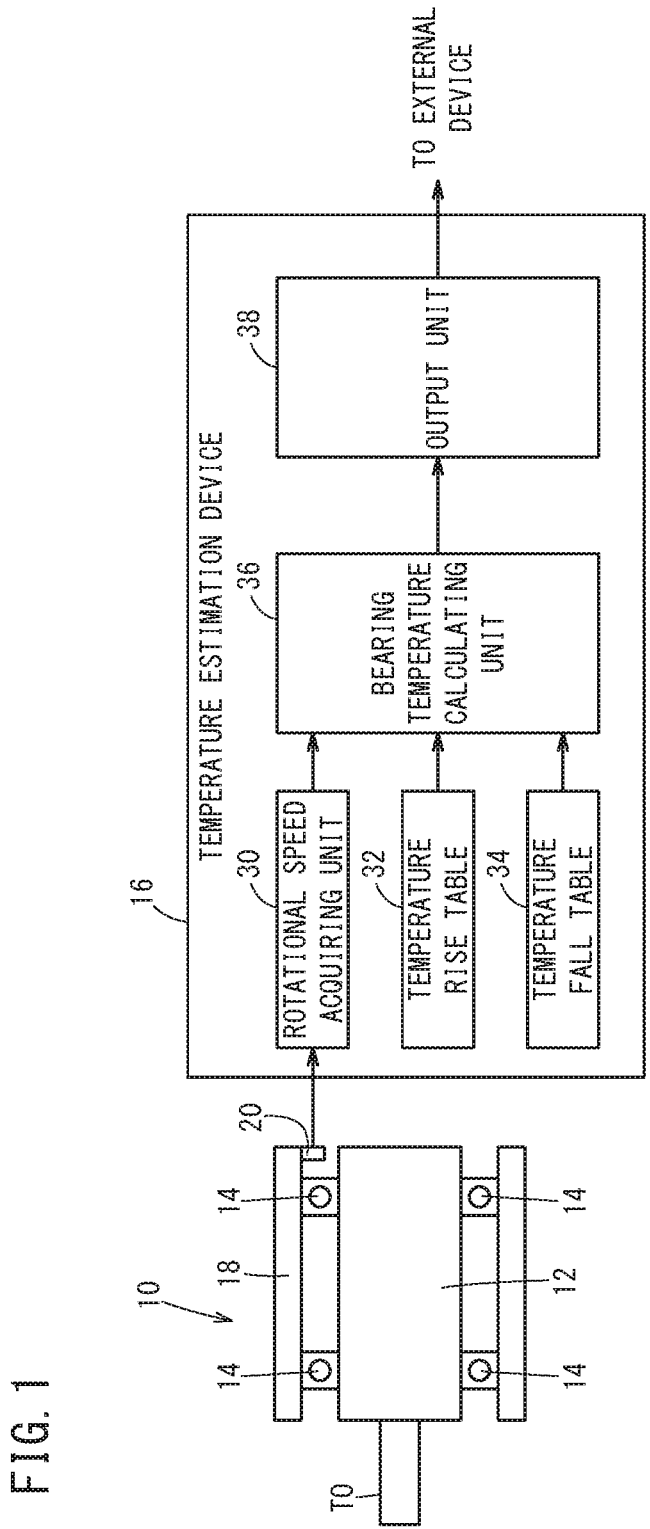
FIG. 1 is a configuration diagram of a temperature estimation device for estimating a temperature of a bearing that supports a spindle of a spindle device in a rotatable manner.

FIG. 1 is a configuration diagram of a temperature estimation device 16 for estimating a temperature T of a bearing 14 that supports a spindle 12 of a spindle device 10 in a rotatable manner.

The spindle device 10 includes a tubular housing 18, the spindle 12, and the bearing 14 that is on an inner side of the housing 18 and supports the spindle 12 in a rotatable manner with respect to the housing 18. This spindle device 10 is provided in a machine tool, and, for example, has a tool TO attached to one end of the spindle 12. The spindle device 10 is provided with a speed sensor 20 that detects a rotational speed (spindle speed) S of the spindle 12.

The temperature estimation device 16 includes a rotational speed acquiring unit 30, a temperature rise table 32, a temperature fall table 34, a bearing temperature calculating unit 36, and an output unit 38. The temperature estimation device 16 is configured by a computer that has a processor such as a CPU, and a memory.

The rotational speed acquiring unit 30 acquires the rotational speed (spindle speed) S of the spindle 12, based on a detection signal detected by the speed sensor 20. Note that the rotational speed acquiring unit 30 may acquire the rotational speed S of the spindle 12, based on a detection signal of an encoder (rotational position sensor, speed sensor) provided in a spindle motor for rotating the spindle 12. The rotational speed S acquired by the rotational speed acquiring unit 30 is sent to the bearing temperature calculating unit 36. Note that the rotational speed S of the spindle 12 changes with lapse of time. For example, the rotational speed S of the spindle 12 changes according to a machining program for controlling the machine tool.

The temperature rise table 32 is a storage medium in which the rotational speed S of the spindle 12 and a temperature rise $\Delta Tp$ of the bearing 14 due to rotation of the spindle 12 in a predetermined fixed time (a minute time, for example, 1 second or less) $\Delta Td$ are stored in an associated manner. The higher the rotational speed S of the spindle 12 becomes, the larger a generated heat amount becomes, so the rotational speed S and the temperature rise ΔTp are stored in an associated manner in the temperature rise table 32, in such a manner that the higher the rotational speed S becomes, the larger the temperature rise ΔTp becomes.

The temperature fall table 34 is a storage medium in which the temperature T of the bearing 14 and a temperature fall ΔTm of the bearing 14 due to heat dissipation in the predetermined fixed time ΔTd are stored in an associated manner. The higher the temperature T of the bearing 14 becomes, the larger a dissipated heat amount becomes, so the temperature T and the temperature fall ΔTm are stored in an associated manner in the temperature fall table 34, in such a manner that the higher the temperature T of the bearing 14 becomes, the larger the temperature fall ΔTm becomes. Note that the temperature T of the bearing 14 when the spindle 12 has not been rotated for a fixed time (for example, 3 hours) will be called an initial temperature Ts. Therefore, the larger a difference between the temperature T and the initial temperature Ts of the bearing 14 becomes, the larger the dissipated heat amount becomes.

The bearing temperature calculating unit 36 uses the temperature rise table 32 and the temperature fall table 34 to calculate the temperature T of the bearing 14 from the rotational speed S of the spindle 12 acquired by the rotational speed acquiring unit 30, every time the fixed time ΔTd elapses. In other words, the bearing temperature calculating unit 36 calculates the temperature T of the bearing 14 by performing on the initial temperature Ts of the bearing 14 an addition of the temperature rise ΔTp and a subtraction of the temperature fall ΔTm, every time the fixed time ΔTd elapses.

Specifically, the bearing temperature calculating unit 36 calculates the temperature T of the bearing 14 after the fixed time ΔTd has elapsed by acquiring from the temperature rise table 32 the temperature rise ΔTp corresponding to a current rotational speed S of the spindle 12 and adding the acquired temperature rise ΔTp to a current temperature T of the bearing 14 and by acquiring from the temperature fall table 34 the temperature fall ΔTm corresponding to the current temperature T of the bearing 14 and subtracting the acquired temperature fall ΔTm from the current temperature T of the bearing 14, every time the fixed time ΔTd elapses. The temperature T of the bearing 14 calculated by the bearing temperature calculating unit 36 is sent to the output unit 38. Note that the bearing temperature calculating unit 36 has an unillustrated timer that clocks a time.

The output unit 38 outputs to an external device (for example, a control device for controlling the machine tool) the temperature T of the bearing 14 calculated by the bearing temperature calculating unit 36. As a result, the external device can perform a certain processing, based on the temperature T of the bearing 14 that has been sent. The certain processing includes the likes of an operation control processing based on the temperature T of the bearing 14, a display control processing to display the temperature T of the bearing 14, or a determination processing of degree-of-deterioration or remaining life of the bearing 14 based on the temperature T of the bearing 14.

Figure 2:
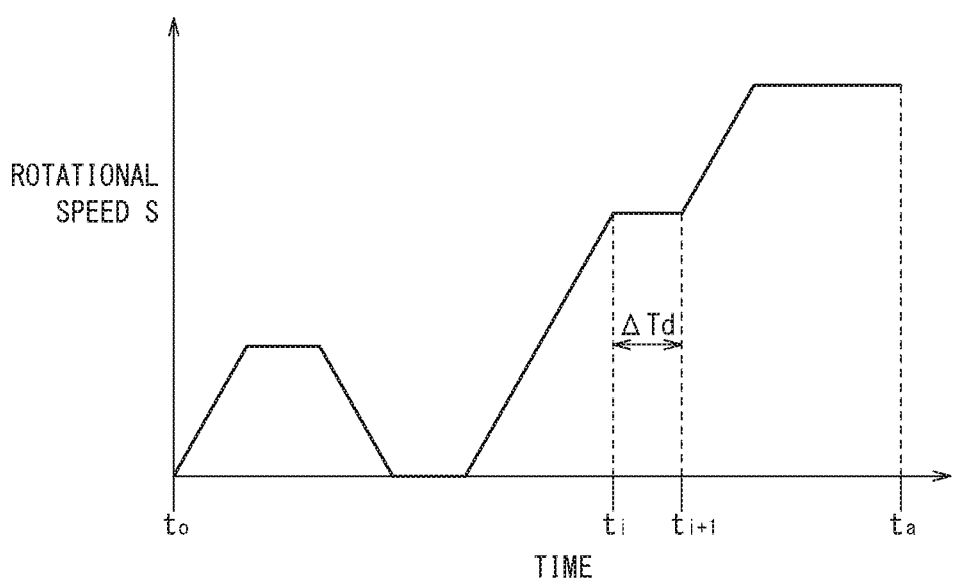
FIG. 2 is a graph showing an example of a relationship between a time and a rotational speed when the spindle is rotated.

Now, calculation of the temperature T of the bearing 14 by the bearing temperature calculating unit 36 will be described in detail using the graph shown in FIG. 2. The graph shown in FIG. 2 is a graph showing an example of a relationship between the time and the rotational speed S when the spindle 12 is rotated.

Symbol $t_i$ indicates a timing of estimating (calculating) the temperature T of the bearing 14 this time, and i is assumed to be an integer satisfying a≥i≥0. Accordingly, a timing $t_{i-1}$ indicates a timing that the temperature T of the bearing 14 the previous time was estimated (calculated), and a timing $t_{i+1}$ indicates a timing that the temperature T of the bearing 14 next time will be estimated (calculated). Therefore, the timing $t_i$, and the timing $t_{i-1}$ one before the timing $t_i$ and timing $t_{i+1}$ one after the timing $t_i$, are out of step by the fixed time ΔTd. Moreover, the rotational speed S of the spindle 12 at the timing $t_i$ will be expressed as $S_i$, and the temperature T of the bearing 14 at the timing $t_i$ will be expressed as $T_i$. A timing $t_i$ that rotation of the spindle 12 has been started in a state where the temperature T of the bearing 14 is the initial temperature Ts, is assumed to be $t_{i=0}$. Consequently, Ts=$T_0$. Note that $t_a$ indicates a timing that calculation of the temperature T of the bearing 14 is finished.

The bearing temperature calculating unit 36 acquires from the temperature rise table 32 the temperature rise ΔTp corresponding to the rotational speed $S_i$ of the spindle 12 at the timing $t_i$, and acquires from the temperature fall table 34 the temperature fall ΔTm corresponding to the temperature $T_i$ of the bearing 14 at the timing $t_i$. Then, the bearing temperature calculating unit 36 uses the temperature $T_i$, the temperature rise ΔTp, and the temperature fall ΔTm to calculate the temperature $T_{i+1}$ of the bearing 14 at the timing $t_{i+1}$. The bearing temperature calculating unit 36 calculates the temperature $T_{i+1}$ using a relational expression $T_{i+1}=T_i+$ ΔTp−ΔTm. As may be understood from this, the bearing temperature calculating unit 36 calculates (estimates) the temperature $T_{i+1}$ of the bearing 14 after the fixed time ΔTd has elapsed from the present (the timing $t_i$).

Figure 3:
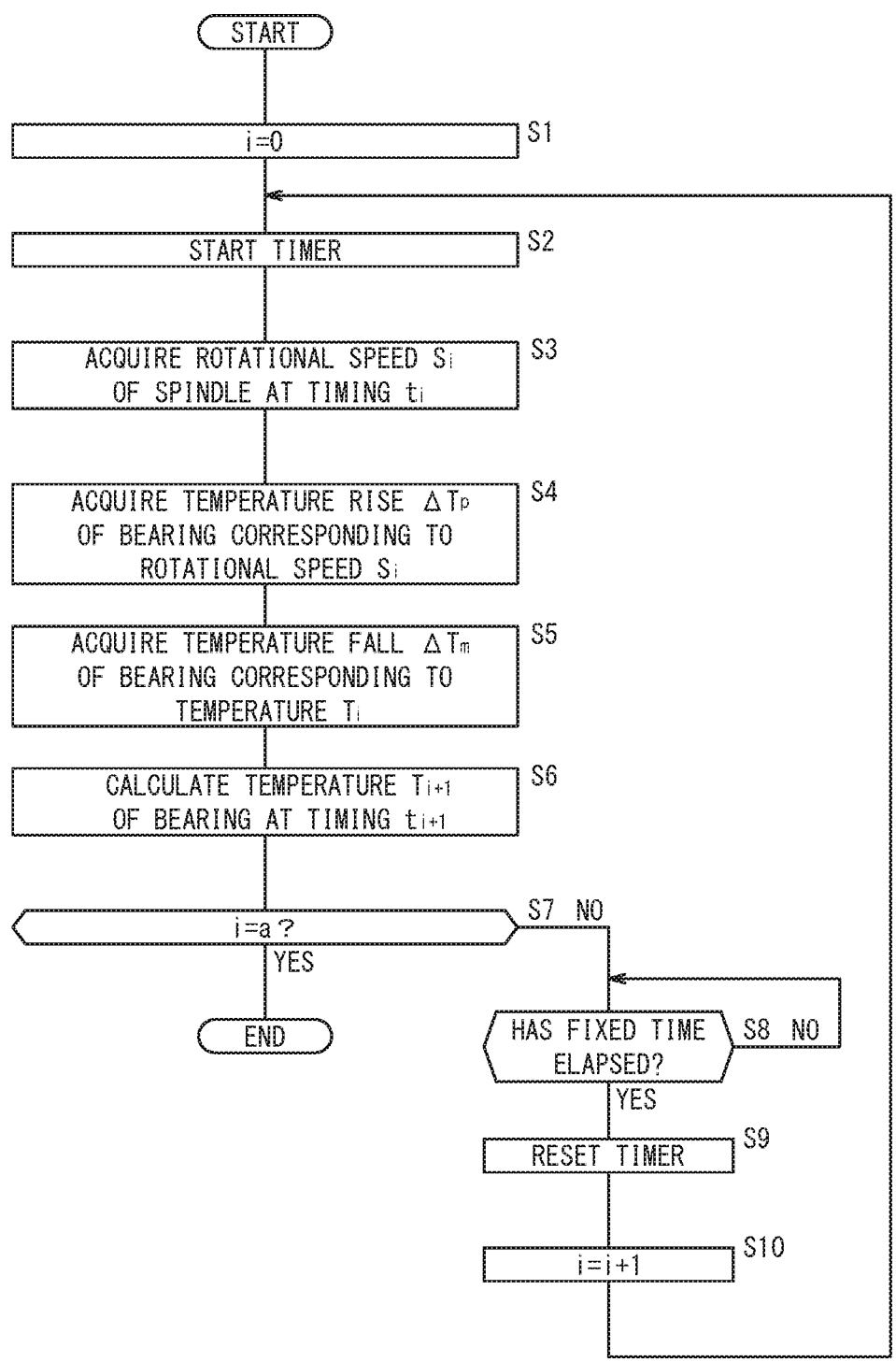
FIG. 3 is a flowchart showing an operation of temperature estimation of the bearing by the temperature estimation device shown in FIG. 1.

Next, an operation of temperature estimation of the bearing 14 by the temperature estimation device 16 will be described following the flowchart of FIG. 3. The operation shown in FIG. 3 is executed in a case where rotation of the spindle 12 is started when the temperature T of the bearing 14 is the initial temperature Ts. Moreover, the speed sensor 20 is assumed to detect the rotational speed S in a cycle of not more than the fixed time ΔTd.

In step S1, the bearing temperature calculating unit 36 sets i=0, and in step S2, the bearing temperature calculating unit 36 starts the timer.

Next, in step S3, the rotational speed acquiring unit 30 acquires the rotational speed $S_i$ of the spindle 12 at the timing $t_i$, and in step S4, the bearing temperature calculating unit 36 acquires from the temperature rise table 32 the temperature rise ΔTp of the bearing 14 corresponding to the rotational speed $S_i$ acquired in step S3.

Next, in step S5, the bearing temperature calculating unit 36 acquires from the temperature fall table 34 the temperature fall ΔTm of the bearing 14 corresponding to the temperature $T_i$ of the bearing 14 at the timing $t_i$. Now, in the case of i=0, the initial temperature Ts will be the temperature $T_{i=0}$ of the bearing 14 at the timing $t_{i=0}$. This initial temperature Ts is stored in the unillustrated memory of the bearing temperature calculating unit 36. Moreover, in the case of i>0, the temperature T calculated at the previous timing $t_{i-1}$ by the bearing temperature calculating unit 36 in later-mentioned step S6, will be the temperature $T_i$ of the bearing 14 at the timing $t_i$.

Next, in step S6, the bearing temperature calculating unit 36 adds to the temperature $T_i$ of the bearing 14 at the timing $t_i$ the temperature rise ΔTp acquired in step S4 and subtracts from the temperature $T_i$ of the bearing 14 at the timing $t_i$ the temperature fall ΔTm acquired in step S5, thereby calculating the temperature $T_{i+1}$ of the bearing 14 at the timing $t_{i+1}$.

Next, in step S7, the bearing temperature calculating unit 36 determines whether or not i=a holds. If it is determined in step S7 that i=a does not hold, then the operation proceeds to step S8, and if it is determined in step S7 that i=a does hold, then the present operation is put to an end.

Upon proceeding to step S8, the bearing temperature calculating unit 36 determines whether or not the fixed time ΔTd has elapsed on the basis of a time clocked by the timer. The operation stays in step S8 until the fixed time ΔTd elapses, and proceeds to step S9 when the fixed time ΔTd elapses.

Upon proceeding to step S9, the bearing temperature calculating unit 36 resets the timer, and in step S10, the bearing temperature calculating unit 36 increments i (i=i+1) and returns to step S2.

Note that the output unit 38 outputs to the external device the temperature $T_{i+1}$ calculated in step S6. The output unit 38 may output the temperature $T_{i+1}$ every time the temperature $T_{i+1}$ is calculated in step S6. Alternatively, when in step S7 it is determined that i=a holds, the output unit 38 may output the temperature $T_{i(=a)+1}$ of the bearing 14 at the timing $t_{i(=a)+1}$, calculated in the previous step S6.

Since the rotational speed S of the spindle 12 changes with lapse of time, and the temperature T of the bearing 14 cannot be accurately determined simply by using the rotational speed S of the spindle 12. However, in the present embodiment, the temperature T of the bearing 14 is calculated every fixed time ΔTd, taking into account also the temperature rise due to rotation and the temperature fall due to heat dissipation, and thus the temperature T of the bearing 14 can be accurately estimated (calculated) at low cost, without using a temperature sensor.

Moreover, since the temperature rise table 32 that stores the temperature rise ΔTp corresponding to the rotational speed S in the fixed time ΔTd is used to calculate the temperature T of the bearing 14, the temperature T of the bearing 14 can be estimated (calculated) accurately. Further, since the temperature fall table 34 that stores the temperature fall ΔTm due to heat dissipation corresponding to the temperature T of the bearing 14 in the fixed time ΔTd is used to calculate the temperature T of the bearing 14, the temperature T of the bearing 14 can be estimated (calculated) accurately.

Note that although in the present embodiment, the temperature $T_{i+1}$ of the bearing 14 at the timing $t_{i+1}$ after the fixed time ΔTd has elapsed from the current timing $t_i$ is calculated, it is possible to configure so as to calculate the temperature $T_i$ of the bearing 14 at the current timing $t_i$. In this case, the temperature $T_i$ of the bearing 14 at the current timing $t_i$ is calculated using the temperature $T_{i-1}$ of the bearing 14 at the previous timing the temperature rise ΔTp corresponding to the rotational speed $S_{i-1}$ at the previous timing $t_{i-1}$, and the temperature fall ΔTm corresponding to the temperature $T_{i-1}$. In other words, the temperature $T_i$ is calculated using a relational expression $T_i=T_{i-1}+\Delta Tp-\Delta Tm$. This method of calculating the temperature T differs only in a calculation timing of the temperature T, and is substantively identical to the method of calculating the temperature T described in the above-described embodiment.

Moreover, the temperature $T_i$ of the bearing 14 at the current timing $t_i$ may be calculated using the temperature $T_{i-1}$ of the bearing 14 at the previous timing $t_{i-1}$, the temperature rise ΔTp corresponding to an average value of the rotational speed S in the fixed time ΔTd from the previous timing $t_{i-1}$ to the timing $t_i$, and the temperature fall ΔTm corresponding to the temperature $T_{i-1}$. Furthermore, the temperature $T_i$ of the bearing 14 at the current timing $t_i$ may be calculated using the temperature $T_{i-1}$ of the bearing 14 at the previous timing $t_{i-1}$, the temperature rise ΔTp corresponding to the rotational speed $S_i$ at the current timing $t_i$, and the temperature fall ΔTm corresponding to the temperature $T_{i-1}$.

[Technical Concepts Obtained from Embodiment]

Technical concepts understandable from the above-described embodiment will be described below.

<First Technical Concept>

The temperature estimation device (16) calculates the temperature (T) of the bearing (14) that supports in a rotatable manner the spindle (12) of the machine tool. The temperature estimation device (16) includes the rotational speed acquiring unit (30) configured to acquire the rotational speed (S) of the spindle (12), the temperature rise table (32) in which the rotational speed (S) of the spindle (12) and the temperature rise (ΔTp) of the bearing (14) due to rotation of the spindle (12) in the predetermined fixed time (ΔTd) are stored in an associated manner, the temperature fall table (34) in which the temperature (T) of the bearing (14) and the temperature fall (ΔTm) of the bearing (14) due to heat dissipation in the fixed time (ΔTd) are stored in an associated manner, and the bearing temperature calculating unit (36) configured to use the temperature rise table (32) and the temperature fall table (34) to calculate the temperature (T) of the bearing (14) from the rotational speed (S) of the spindle (12) every time the fixed time (ΔTd) elapses.

As a result, the temperature (T) of the bearing (14) can be accurately estimated (calculated) at low cost, without using a temperature sensor.

The bearing temperature calculating unit (36) may calculate the temperature of the bearing (14) by performing on the initial temperature (Ts) of the bearing (14) an addition of the temperature rise (ΔTp) and a subtraction of the temperature fall (ΔTm) every time the fixed time (ΔTd) elapses. As a result, the temperature (T) of the bearing (14) can be accurately estimated (calculated) at low cost, without using a temperature sensor.

The bearing temperature calculating unit (36) may calculate the temperature (T) of the bearing (14) after the fixed time (ΔTd) has elapsed, by acquiring from the temperature rise table (32) the temperature rise (ΔTp) corresponding to a current rotational speed (S) of the spindle (12) and adding the acquired temperature rise (ΔTp) to the current temperature (T) of the bearing (14) and by acquiring from the temperature fall table (34) the temperature fall (ΔTm) corresponding to the current temperature (T) of the bearing (14) and subtracting the acquired temperature fall (ΔTm) from the current temperature (T) of the bearing (14), every time the fixed time (ΔTd) elapses. As a result, the temperature (T) of the bearing (14) can be accurately estimated (calculated) at low cost, without using a temperature sensor.

<Second Technical Concept>

The temperature estimation method calculates the temperature (T) of the bearing (14) that supports in a rotatable manner the spindle (12) of the machine tool. The temperature estimation method includes a rotational speed acquisition step of acquiring the rotational speed (S) of the spindle (12), and a bearing temperature calculation step of, by using the temperature rise table (32) in which the rotational speed (S) of the spindle (12) and the temperature rise (ΔTp) of the bearing (14) due to rotation of the spindle (12) in the predetermined fixed time (ΔTd) are stored in an associated manner, and also by using the temperature fall table (34) in which the temperature (T) of the bearing (14) and the temperature fall (ΔTm) of the bearing (14) due to heat dissipation in the fixed time (ΔTd) are stored in an associated manner, calculating the temperature (T) of the bearing (14) from the rotational speed (S) of the spindle (12) every time the fixed time (ΔTd) elapses.

As a result, the temperature (T) of the bearing (14) can be accurately estimated (calculated) at low cost, without using a temperature sensor.

In the bearing temperature calculation step, the temperature of the bearing (14) may be calculated by performing on the initial temperature (Ts) of the bearing (14) an addition of the temperature rise (ΔTp) and a subtraction of the temperature fall (ΔTm) every time the fixed time (ΔTd) elapses. As a result, the temperature (T) of the bearing (14) can be accurately estimated (calculated) at low cost, without using a temperature sensor.

In the bearing temperature calculation step, the temperature (T) of the bearing (14) after the fixed time (ΔTd) has elapsed may be calculated by acquiring from the temperature rise table (32) the temperature rise (ΔTp) corresponding to a current rotational speed (S) of the spindle (12) and adding the acquired temperature rise (ΔTp) to the current temperature (T) of the bearing (14) and by acquiring from the temperature fall table (34) the temperature fall (ΔTm) corresponding to the current temperature (T) of the bearing (14) and subtracting the acquired temperature fall (ΔTm) from the current temperature (T) of the bearing (14), every time the fixed time (ΔTd) elapses. As a result, the temperature (T) of the bearing (14) can be accurately estimated (calculated) at low cost, without using a temperature sensor.

The present invention is not particularly limited to the embodiment described above, and various modifications are possible without departing from the essence and gist of the present invention.

What is claimed is:

1. A temperature estimation device for calculating a temperature of a bearing configured to support a spindle of a machine tool in a rotatable manner, comprising:
    a rotational speed acquiring unit configured to acquire a rotational speed of the spindle;
    a temperature rise table in which the rotational speed of the spindle and a temperature rise of the bearing due to rotation of the spindle in a predetermined fixed time are stored in an associated manner;
    a temperature fall table in which the temperature of the bearing and a temperature fall of the bearing due to heat dissipation in the fixed time are stored in an associated manner; and
    a bearing temperature calculating unit configured to use the temperature rise table and the temperature fall table to calculate the temperature of the bearing from the rotational speed of the spindle every time the fixed time elapses.

2. The temperature estimation device according to claim 1, wherein the bearing temperature calculating unit calculates the temperature of the bearing by performing on an initial temperature of the bearing an addition of the temperature rise and a subtraction of the temperature fall every time the fixed time elapses.

3. The temperature estimation device according to claim 1, wherein the bearing temperature calculating unit calculates the temperature of the bearing after the fixed time has elapsed, by acquiring from the temperature rise table the temperature rise corresponding to a current rotational speed of the spindle and adding the acquired temperature rise to a current temperature of the bearing and by acquiring from the temperature fall table the temperature fall corresponding to the current temperature of the bearing and subtracting the acquired temperature fall from the current temperature of the bearing, every time the fixed time elapses.

4. A temperature estimation method for calculating a temperature of a bearing configured to support a spindle of a machine tool in a rotatable manner, comprising:
    a rotational speed acquisition step of acquiring a rotational speed of the spindle; and
    a bearing temperature calculation step of, by using a temperature rise table in which the rotational speed of the spindle and a temperature rise of the bearing due to rotation of the spindle in a predetermined fixed time are stored in an associated manner, and also by using a temperature fall table in which the temperature of the bearing and a temperature fall of the bearing due to heat dissipation in the fixed time are stored in an associated manner, calculating the temperature of the bearing from the rotational speed of the spindle every time the fixed time elapses.

5. The temperature estimation method according to claim 4, wherein in the bearing temperature calculation step, the temperature of the bearing is calculated by performing on an initial temperature of the bearing an addition of the temperature rise and a subtraction of the temperature fall every time the fixed time elapses.

6. The temperature estimation method according to claim 4, wherein in the bearing temperature calculation step, the temperature of the bearing after the fixed time has elapsed is calculated by acquiring from the temperature rise table the temperature rise corresponding to a current rotational speed of the spindle and adding the acquired temperature rise to a current temperature of the bearing and by acquiring from the temperature fall table the temperature fall corresponding to the current temperature of the bearing and subtracting the acquired temperature fall from the current temperature of the bearing, every time the fixed time elapses.

* * * * *